(12) United States Patent
Bian et al.

(10) Patent No.: US 11,727,052 B2
(45) Date of Patent: Aug. 15, 2023

(54) INSPECTION SYSTEMS AND METHODS INCLUDING IMAGE RETRIEVAL MODULE

(71) Applicant: General Electric Company, Schenectady, NY (US)

(72) Inventors: Xiao Bian, Santa Clara, CA (US); Bernard Patrick Bewlay, Niskayuna, NY (US); Colin James Parris, Brookfield, CT (US); Feng Xue, Clifton Park, NY (US); Shaopeng Liu, Clifton Park, NY (US); Arpit Jain, Dublin, CA (US); Shourya Sarcar, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 17/011,909

(22) Filed: Sep. 3, 2020

(65) Prior Publication Data

US 2022/0067082 A1 Mar. 3, 2022

(51) Int. Cl.
*G06V 10/25* (2022.01)
*G06F 16/583* (2019.01)
(Continued)

(52) U.S. Cl.
CPC ............ *G06F 16/583* (2019.01); *G06F 16/51* (2019.01); *G06F 16/9014* (2019.01); *G06N 3/045* (2023.01); *G06V 10/25* (2022.01)

(58) Field of Classification Search
CPC .................................................. G06N 3/0454
See application file for complete search history.

(56) References Cited

U.S. PATENT DOCUMENTS 8,331,650 B2 12/2012 Yuan
8,345,982 B2 1/2013 Gokturk et al.
(Continued)

FOREIGN PATENT DOCUMENTS

CN 105260412 A 1/2016
CN 107229757 A 10/2017
(Continued)

OTHER PUBLICATIONS

Guo et al., "Region Annotations in Hashing Based Image Retrieval", ICIMCS '14 Proceedings of International Conference on Internet Multimedia Computing and Service, pp. 1-4, Jul. 10-12, 2014.
(Continued)

*Primary Examiner* — Edward Park
(74) *Attorney, Agent, or Firm* — Fitch Even Tabin & Flannery LLP

(57) ABSTRACT

A method of inspecting a component using an image retrieval module includes storing an inspection image file in a memory and identifying a region of interest in the inspection image file. The method further includes accessing a database storing image files and determining feature vectors associated with the image files. The method also includes determining a hash code for each image file based on the feature vectors and classifying a subset of image files as relevant based on the hash codes. The method further includes sorting the subset of image files based on the feature vectors and generating search results based on the sorted subset of image files. The image retrieval module includes a convolutional neural network configured to learn
(Continued)

from the determination of the feature vectors and increase the accuracy of the image retrieval module in classifying the image files.

20 Claims, 4 Drawing Sheets

(51) Int. Cl.
  *G06F 16/51* (2019.01)
  *G06F 16/901* (2019.01)
  *G06N 3/045* (2023.01)

(56) References Cited

U.S. PATENT DOCUMENTS

| | | | |
|---|---|---|---|
| 8,792,705 | B2 | 7/2014 | Scheid |
| 9,424,277 | B2 | 8/2016 | Retterath et al. |
| 9,542,405 | B2 | 1/2017 | Park et al. |
| 10,223,610 | B1 | 3/2019 | Akselrod-Ballin et al. |
| 10,289,702 | B2 | 5/2019 | Drake et al. |
| 10,467,502 | B2 | 11/2019 | Ren |
| 10,475,174 | B2 | 11/2019 | Lim |
| 2009/0324077 | A1* | 12/2009 | Wu ............... H04N 21/44008 382/218 |
| 2017/0316287 | A1 | 11/2017 | Mu et al. |
| 2017/0343481 | A1 | 11/2017 | Jahanshahi |
| 2019/0080446 | A1 | 3/2019 | Kuzmin |
| 2019/0303717 | A1 | 10/2019 | Bhaskar |
| 2019/0304077 | A1 | 10/2019 | Wang |
| 2020/0154165 | A1 | 5/2020 | Cohen |
| 2021/0099310 | A1* | 4/2021 | Fang ................... G06F 21/64 |
| 2022/0067083 | A1 | 3/2022 | Liu |

FOREIGN PATENT DOCUMENTS

| | | |
|---|---|---|
| CN | 106227851 B | 10/2019 |
| CN | 110297931 A | 10/2019 |

OTHER PUBLICATIONS

Zhou et al., "Recent Advance in Content-Based Image Retrieval: A Literature Survey", Multimedia (cs.MM); Information Retrieval (cs.IR), pp. 01-22, Sep. 2, 2017.

Bai et al., "Deep Progressive Hashing for Image Retrieval", IEEE Transactions on Multimedia, vol. 21, Issue: 12, pp. 3178-3193, Dec. 2019.

Babenko et al., "Aggregating Deep Convolutional Features for Image Retrieval", ICCV 2015, pp. 4321-4329, Oct. 26, 2015.

Cao et al., "Deep Cauchy Hashing for Hamming Space Retrieval", 2018 IEEE/CVF Conference on Computer Vision and Pattern Recognition, pp. 1229-1237, Sait Lake City, USA, Jun. 18-23, 2018.

Covington et al., "Deep Neural Networks for YouTube Recommendations", Proceedings of the 10th ACM Conference on Recommender Systems, pp. 191-198, Sep. 15-19, 2016.

Hsieh et al., "Learning to Decompose and Disentangle Representations for Video Prediction", 32nd Conference on Neural Information Processing Systems (NeurIPS 2018), pp. 1-10, Canada, 2018.

Jing et al., "Visual Search at Pinterest", In Proceedings of the 21st ACM SIGKDD International Conference on Knowledge and Discovery and Data Mining, 2015, vol. 1, pp. 1-10, May 28, 2015.

Norouzi et al., "Hamming Distance Metric Learning", Advances in Neural Information Processing Systems 25 (NIPS 2012), pp. 1-9, 2012.

Park et al., "Machine Learning-Based Imaging System for Surface Defect Inspection", International Journal of Precision Engineering and Manufacturing-Green Technology, vol. 3, Issue: 3, pp. 303-310, Jul. 2016.

Ri-Xian et al., "Defects Detection Based On Deep Learning and Transfer Learning", Metallurgical and Mining Industry, pp. 312-321, Nov. 7, 2015.

Weimer et al., "Design Of Deep Convolutional Neural Network Architectures For Automated Feature Extraction in Industrial Inspection", CIRP Annals, vol. 65, Issue: 1, pp. 417-420, 2016.

USPTO; U.S. Appl. No. 17/011,912; Notice of Allowance and Fees Due (PTOL-85) dated Jul. 25, 2022; (pp. 1-10).

* cited by examiner

INSPECTION SYSTEMS AND METHODS INCLUDING IMAGE RETRIEVAL MODULE

BACKGROUND

The field of the disclosure relates generally to systems and methods of inspecting a component, and more particularly, to systems and methods of inspecting a component using an image retrieval module.

Components are inspected using inspection systems at various stages of manufacture or use to obtain information regarding the components' current state and potential operational life. For example, in at least some known inspection systems, users analyze images of the components to identify features or anomalies such as defects, material wear, and damage. However, the users are not always able to accurately, consistently, and reliably analyze the images. Accordingly, at least some known inspection systems utilize a database of image files to assist the user in inspecting the components. However, such inspection system must process each image file in the database to find relevant image files during a retrieval process. As a result, the time required to inspect the components is increased because the inspection system must spend time analyzing each image file in the database. Moreover, at least some of the image files retrieved from the database may be irrelevant and obscure any useful information that is provided.

Accordingly, there is a need for inspection systems that are able to filter and sort image files in a database and retrieve image files from the database that are relevant for an inspection image file.

BRIEF DESCRIPTION

In one aspect, a method of inspecting a component using an image inspection controller that includes a processor communicatively coupled to a memory and configured to operate in accordance with an image retrieval module is provided. The method includes storing, using the processor, at least one inspection image file in the memory and identifying, using the processor, a region of interest in the at least one inspection image file. The method further includes determining, using the processor, at least one foreground feature vector associated with the region of interest in the at least one inspection image file. The method also includes accessing, using the processor, a database storing a plurality of image files, and determining a plurality of feature vectors associated with the plurality of image files. Each image file of the plurality of image files is associated with at least one feature vector of the plurality of feature vectors. The image retrieval module includes at least one convolutional neural network configured to learn from the determination of the plurality of feature vectors and increase the accuracy of the image retrieval module in classifying the plurality of image files. The method also includes determining, using the processor, at least one hash code for each image file of the plurality of image files based on the plurality of feature vectors and classifying a subset of the plurality of image files as relevant based on the hash codes of the plurality of image files. The method further includes sorting, using the processor, the subset of the plurality of image files based on the plurality of feature vectors, and generating, using the processor, search results based on the sorted subset of the plurality of image files.

In another aspect, a system for inspecting a component is provided. The system includes at least one memory comprising a database storing a plurality of image files, and at least one processor configured to access the at least one memory and operate in accordance with an image retrieval module. The at least one processor is programmed to store at least one inspection image file in the memory and identify a region of interest in the at least one inspection image file. The at least one processor is also configured to determine at least one foreground feature vector associated with the region of interest in the at least one inspection image file and determine a plurality of feature vectors associated with the plurality of image files. Each image file of the plurality of image files is associated with at least one feature vector of the plurality of feature vectors. The image retrieval module includes at least one convolutional neural network configured to learn from the determination of the plurality of feature vectors and increase the accuracy of the image retrieval module in classifying the plurality of image files. The at least one processor is further configured to determine at least one hash code for each image file of the plurality of image files based on the plurality of feature vectors, and classify a subset of the plurality of image files as relevant based on the hash codes of the plurality of image files. The at least one processor is also configured to sort the subset of the plurality of image files based on the plurality of feature vectors for the plurality of image files and generate search results based on the sorted subset of the plurality of image files.

In yet another aspect, a retrieval module for identifying at least one feature in at least one image of a component is provided. The retrieval module is configured to cause a processor to store at least one inspection image file in a memory, identify a region of interest in the at least one inspection image file, and determine at least one foreground feature vector associated with the region of interest in the at least one inspection image file. The retrieval module is also configured to cause the processor to access a database storing a plurality of image files, and determine a plurality of feature vectors associated with the plurality of image files. Each image file of the plurality of image files is associated with at least one feature vector of the plurality of feature vectors. The image retrieval module includes at least one convolutional neural network configured to learn from the determination of the plurality of feature vectors and increase the accuracy of the image retrieval module in classifying the plurality of image files. The retrieval module is further configured to cause the processor to determine at least one hash code for each image file of the plurality of image files based on the plurality of feature vectors, and classify a subset of the plurality of image files as relevant based on the hash codes of the plurality of image files. The retrieval module is also configured to sort the subset of the plurality of image files based on the plurality of feature vectors for the plurality of image files, and generate search results based on the sorted subset of the plurality of image files.

DRAWINGS

These and other features, aspects, and advantages of the present disclosure will become better understood when the following detailed description is read with reference to the accompanying drawings in which like characters represent like parts throughout the drawings, wherein.

Figure 1:
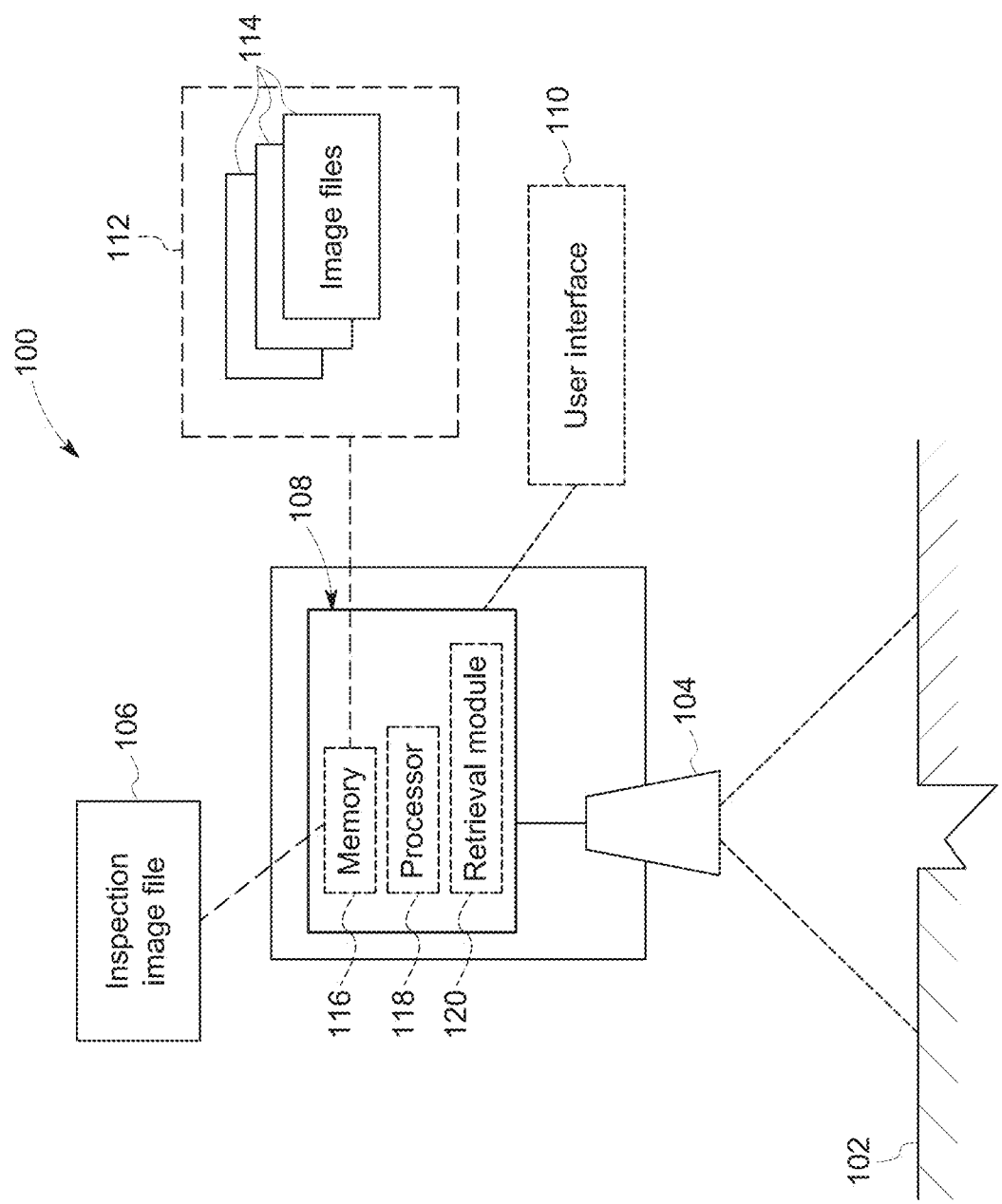
FIG. 1 is a schematic diagram of a system for inspecting a component.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

As used herein, the terms "anomaly" and "anomalies" refer to areas of variation within a component. Areas of variation include, for example and without limitation, defects, dislocations, cracks, wear, voids, deformations, stress concentrations, disruptions, fissures, inclusion of foreign particles, and corrosion.

The disclosure includes systems and methods for inspecting a component. The systems and methods described herein include a retrieval module configured to analyze at least one inspection image file of the component and retrieve image files from a database to assist in analyzing the inspection image file. The retrieval module utilizes specific information extracted from the image files to identify potentially relevant image files in the database and sort the image files. For example, the retrieval module determines feature vectors of the image files and then determines hash codes of the image files based on the feature vectors. The retrieval module identifies a subset of the image files as potentially relevant for the at least one inspection image file based on the hash codes. The retrieval module sorts the subset of the image files based on the feature vectors. As a result, the systems and methods described herein are able to more quickly and accurately retrieve relevant image files from a database than at least some known inspection systems.

In addition, the systems and methods described herein are able to classify and identify regions of interest in the relevant image files. For example, the retrieval module extracts background and foreground feature vectors based on a region of interest that is identified when the at least one inspection image file is provided for the retrieval module. The retrieval module compares the foreground and background feature vectors of the at least one inspection image file to feature vectors of the subset of image files and identifies features and/or regions in the image files that correspond to the region of interest in the at least one inspection image. Therefore, the retrieval module is able to focus on the region of interest to simplify the retrieval process and provide image files that relate specifically to the region of interest in the inspection image.

Moreover, the systems and methods described herein include a user interface that allows a user to generate a search request based on at least one inspection image and view an inspection report based on the search request. In some embodiments, the inspection report includes information relating to image files that are classified as relevant. For example, the inspection report may include treatment decisions or historical outcomes for regions of interest or anomalies similar to the searched image file. In addition, the user interface may highlight regions of interest in the image files that correspond to the region of interest identified in the at least one inspection image file. As a result, the user interface highlights relevant information for the user that can increase the accuracy and reliability of the current inspection and provides context to the user on how similar anomalies were treated in the past and/or outcomes for the anomalies.

Also, the systems and methods described herein utilize self-learning to increase the accuracy of the classification process. For example, the retrieval module recognizes hash codes and feature vectors from previous searches when extracting the feature vectors and/or the hash codes of the image files in the database and utilizes historical information to provide a hash code bin that simplifies the classification process. Moreover, the retrieval module may learn to identify and classify anomalies shown in the inspection image files at least partly autonomously and, therefore, decrease errors and inconsistencies of at least some human inspections.

FIG. 1 is a schematic diagram of a system 100 for inspecting a component 102. System 100 includes a camera 104 configured to capture at least one inspection image file 106 of component 102, a controller 108 communicatively coupled to camera 104, and a user interface 110 configured to receive user inputs and/or display information for a user. In particular, in the exemplary embodiment, user interface 110 is configured to enable a user to provide inspection image files 106 captured by camera 104 and/or a camera external to system 100. Image files 106 may include videos, photographs, drawings, and any other visual representation of an object. In some embodiments, controller 108 is configured to receive inspection image files 106 from camera 104 and identify at least one feature of component 102 based on image files 106. In some embodiments, system 100 includes a repair tool (not shown) configured to perform a maintenance operation for component 102.

In addition, in the exemplary embodiment, system 100 is configured to access a database 112 storing a plurality of image files 114. Image files 114 may include images provided from previous inspections or search requests. Accordingly, the number of image files 114 in database 112 may increase as more inspections and/or searches are performed. System 100 is able to process and classify an increasing number of image files 114 as system 100 "learns" from the classification process as described herein. Moreover, system 100 is able to more accurately classify image files 114 than at least some known systems because system 100 focuses on specific regions of interest in inspection image files 106 and analyzes backgrounds as context for the regions of interest.

In some embodiments, controller 108 is configured to control one or more components of system 100, such as camera 104. Also, in the exemplary embodiment, controller 108 includes at least one memory 116 configured to store image files 106 captured by camera 104 and/or image files 114 retrieved from database 112, and at least one processor 118 configured to access memory 116 and database 112. In some embodiments, database 112 is stored in memory 116. In the exemplary embodiment, processor 118 may be programmed by encoding an operation using one or more executable instructions and providing the executable instructions in memory 116. In the exemplary embodiment, processor 118 is programmed to access image files 114 of database 112 and operate according to a retrieval module 120 to filter and sort image files 114. In particular, in some embodiments, controller 108 is configured to operate in accordance with retrieval module 120 to utilize feature vectors and hash codes of image files 114 to filter and sort image files 114. In addition, in some embodiments, controller 108 is configured to generate inspection reports based on retrieved image files 114. Retrieval module 120 may be included in software or programming stored on memory 116, incorporated into processor 118, and/or stored at least partially on an external computing device. In alternative embodiments, system 100 includes any controller 108 that enables system 100 to operate as described herein. For example, in some embodiments, at least a portion of controller 108 is located remote from other components of system 100 and is configured to communicate with components of system 100 via a wired and/or unwired link.

Memory 116 may include any appropriate information storage device, including combinations of magnetic storage devices (e.g., a hard disk drive), optical storage devices, mobile telephones, and/or semiconductor memory devices. In the exemplary embodiment, memory 116 includes one or more devices that enable information, such as executable instructions and/or other data, to be stored and retrieved. Moreover, memory 116 includes one or more computer readable media, such as, without limitation, dynamic random access memory (DRAM), static random access memory (SRAM), a solid state disk, and/or a hard disk. In the exemplary embodiment, memory 116 stores, without limitation, application source code, application object code, configuration data, additional input events, application states, assertion statements, validation results, and/or any other type of data.

In the exemplary embodiment, retrieval module 120 utilizes a training process involving self-learning to increase the accuracy of the sorting and filtering processes for image files 114. As controller 108 retrieves image files 114, controller 108 learns from the retrieval processes using a deep convolutional neural network (CNN). Accordingly, the accuracy by which controller 108 sorts and filters image files 114 increases as controller 108 sorts and filters more image files 114. For example, in some embodiments, retrieval module 120 is configured to learn from extraction of feature vectors and hash codes to increase the accuracy of retrieval module 120 in retrieving the plurality of image files 114. In some embodiments, retrieval module 120 determines a learning loss based on the feature vectors and uses the learning loss to facilitate the self-learning process.

Figure 2:
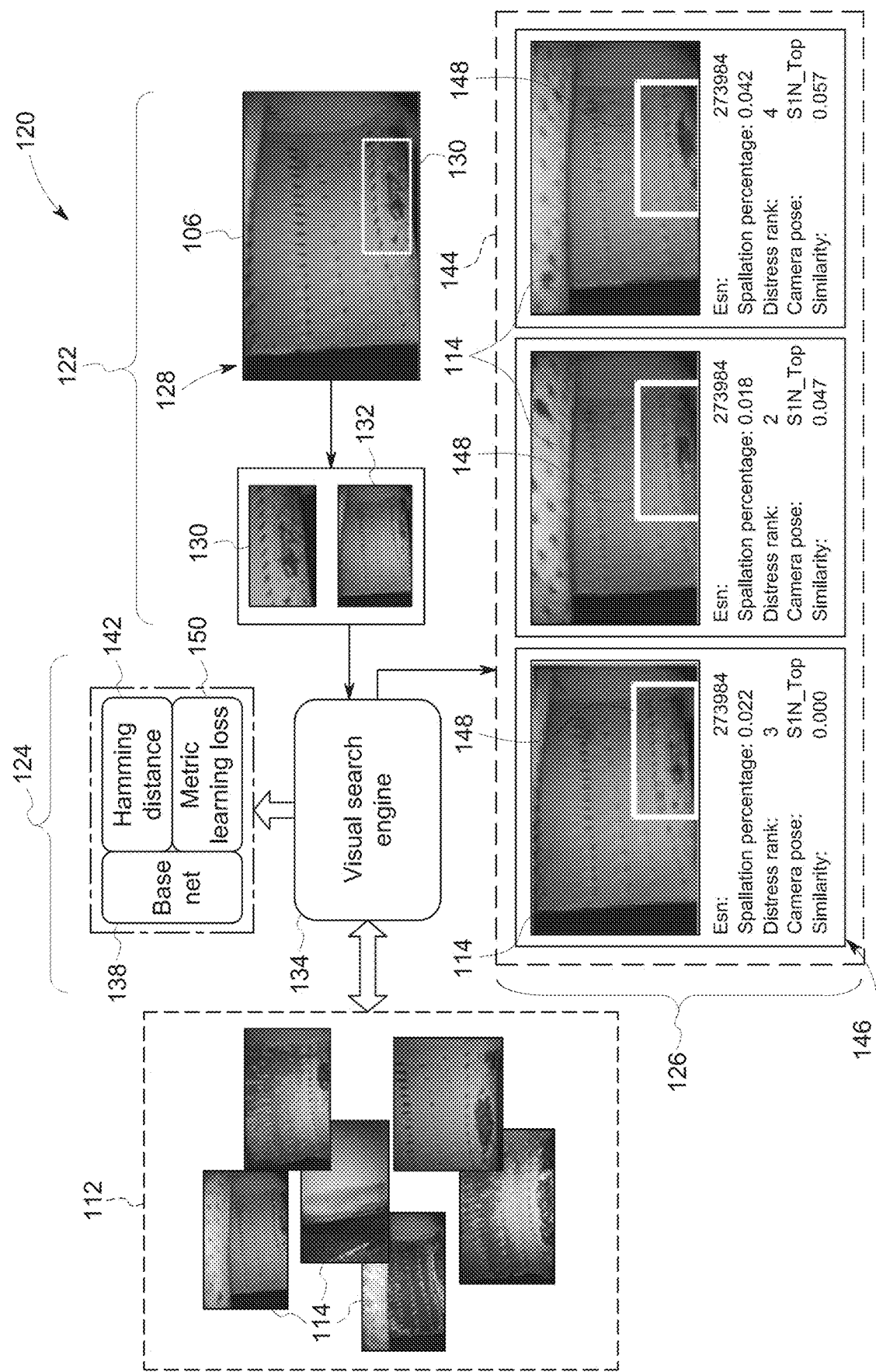
FIG. 2 is a schematic diagram of a retrieval module of the system shown in FIG. 1.
Figure 3:
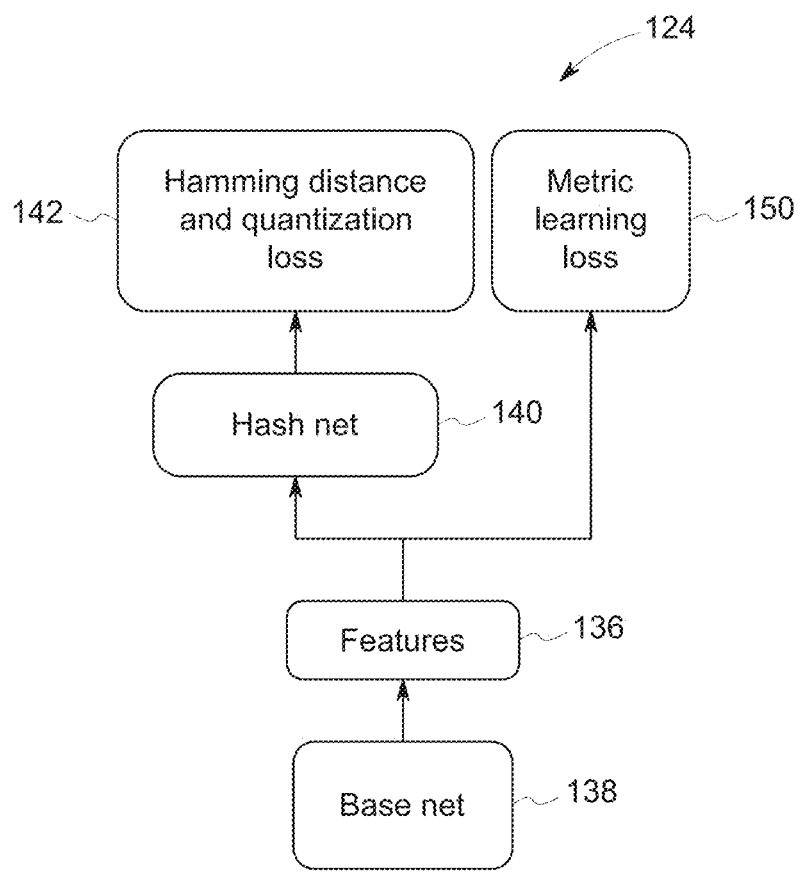
FIG. 3 is a schematic diagram of an image retrieval phase of the retrieval module shown in FIG. 3.

FIG. 2 is a schematic diagram of retrieval module 120 of system 100. FIG. 3 is a schematic diagram of an image retrieval phase 124 of retrieval module 120. In the exemplary embodiment, retrieval module 120 includes a query phase 122, an image retrieval phase 124, and a results phase 126. Phases 122, 124, and 126 may be performed sequentially in any order and/or performed at least partially simultaneously. In alternative embodiments, retrieval module 120 includes any phase that enables retrieval module 120 to operate as described herein.

In the exemplary embodiment, query phase 122 includes receiving a search request 128 based on at least one inspection image file 106. Search request 128 may be received via user interface 110 (shown in FIG. 1). For example, in some embodiments, a user uploads or otherwise provides inspection image file 106 via user interface 110 (shown in FIG. 1) and user interface 110 generates search request 128 based on inspection image file 106. In further embodiments, the user may or may not input information in addition to or in place of inspection image file 106. In some embodiments, inspection image file 106 is generated using camera 104 (shown in FIG. 1). In further embodiments, inspection image file 106 is provided from an external source. Inspection image file 106 may be stored in memory 116 (shown in FIG. 1). Search request 128 may relate to a feature of component 102 (shown in FIG. 1) and/or a region of interest on image file 114. In alternative embodiments, retrieval module 120 receives any search request 128 that enables system 100 to operate as described herein.

In addition, in the exemplary embodiment, query phase 122 includes identifying a region of interest 130 on inspection image file 106. Region of interest 130 may be identified by the user via user interface 110 (shown in FIG. 1). For example, the user may draw region of interest 130 on inspection image file 106 via user interface 110 (shown in FIG. 1). In some embodiments, the user may identify region of interest 130 prior to uploading inspection image file 106. In further embodiments, user interface 110 (shown in FIG. 1) highlights possible regions of interest or otherwise assists the user in identifying region of interest 130. In some embodiments, user interface 110 is able to autonomously identify region of interest 130 without user input.

Moreover, in the exemplary embodiment, query phase 122 includes determining at least one foreground feature vector associated with region of interest 130 and at least one background feature vector associated with a background 132 of inspection image file 106. For example, retrieval module 120 recognizes feature data that is associated with region of interest 130 as foreground feature data and extracts foreground feature vectors from the foreground feature data. Retrieval module 120 recognizes feature data that is not associated with region of interest 130 as background feature data and extracts background feature vectors from the background feature data. In addition, in some embodiments, retrieval module 120 determines hash codes for inspection image file 106 based on the feature vectors. Accordingly, inspection image file 106 may be represented by feature vectors and hash codes. In some embodiments, retrieval module 120 utilizes a search engine 134 to process inspection image file 106 and/or image files 114.

Also, in the exemplary embodiment, retrieval phase 124 includes accessing database 112 which includes image files 114 and retrieving image files 114 based on search request 128. In the exemplary embodiment, retrieval module 120 determines feature vectors 136 for each image file 114 in a base net 138 and identifies hash codes of image files 114 based on feature vectors 136. Feature vectors 136 include values representing one or more features of image file 114. For example, retrieval module 120 extracts from each image file 114 at least one foreground feature vector corresponding to a foreground of image file 114 and at least one background feature vector corresponding to a background of image file 114. Based on the extracted feature vectors, retrieval module 120 determines hash codes associated with image files 114 using a hash net 140. The hash codes may be vectors including binarized identification data for each image file 114. In the exemplary embodiment, retrieval module 120 determines a set of background vectors (e.g., a feature vector and a hash code vector) and a set of foreground vectors (e.g., a feature vector and a hash code vector) for each image file 114.

In the exemplary embodiment, retrieval module 120 includes at least one convolutional neural network configured to learn from the determination of feature vectors 136 and hash codes and increase the accuracy of retrieval module 120 in determining feature vectors 136 and generating hash net 140. In some embodiments, retrieval module 120 is "trained" by processing and classifying a plurality of image files 114 before and/or after search request 128 is received. For example, retrieval module 120 maps image files 114 in database 112 (shown in FIG. 1) in a hash code space and a feature vector space. As a result, retrieval module 120 is able to quickly process and classify image files 114 when search request 128 is received.

Moreover, in the exemplary embodiment, retrieval phase 124 includes comparing the hash code of inspection image file 106 to the hash code of each image file 114. For example, in some embodiments, retrieval module 120 is configured to sort image files 114 using hamming distances 142, e.g., a predefined range from a specified hash code value. Retrieval module 120 is configured to identify at least one subset 144 of image files 114 based on hamming distances 142. For example, in some embodiments, subset 144 includes image file 114 for which the particular hamming distance between the hash code of inspection image file 106 and the hash code of image file 114 is less than a threshold value. In some embodiments, retrieval module 120 processes image files 114 in groups such that subset 144 includes image files 114 of one or more groups with a hash code range that overlaps or is close to the hash code of inspection image file 106. In some embodiments, a quantization loss is determined from hash net 140 when hamming distance 142 is determined and the quantization loss is used by the CNN to train retrieval module 120.

Moreover, in the exemplary embodiment, retrieval phase 124 includes sorting the subset of image files 114 based on the determined feature vectors 136. For example, in some embodiments, retrieval module 120 compares foreground feature vectors of inspection image file 106 to foreground feature vectors of each image file 114 and compares background feature vectors of inspection image file 106 to background feature vectors of each image file 114. Based on the feature vector comparisons, retrieval module 120 determines similarities and differences between image file 106 and image files 114, and sorts subset 144 based on the similarities and differences. For example, in some embodiments, retrieval module 120 measures distances between features and characterizes image files 114 based on the distances. In particular, retrieval phase 124 classifies image files 114 as relevant if the differences between the feature vectors of inspection image file 106 and image files 114 are less than a threshold value. In alternative embodiments, retrieval module 120 compares and classifies image files 114 in any manner that enables retrieval module 120 to function as described herein. In some embodiments, retrieval module 120 is able to identify and/or classify features and/or regions of interest in image file 114 at least partly autonomously by comparing feature vectors of inspection image file 106 and image files 114.

In addition, in the exemplary embodiment, results phase 126 includes providing search results 146. In some embodiments, search results 146 include an inspection report based on the comparison of inspection image file 106 and image files 114 in subset 144, a list of subset 144 of image files 114, historic inspection reports associated with inspection image file 106 and/or image files 114, and/or information related to at least one feature or at least one region of interest in the image data of inspection image file 106. For example, in some embodiments, the inspection reports highlights features and/or regions of interest in inspection image file 106 and provides recommendations or possible courses of action based on the identified features. In the exemplary embodiment, retrieval module 120 highlights regions of interest 148 in image files 114 that correspond to region of interest 130 identified in image file 106.

In addition, in some embodiments, retrieval module 120 includes CNN operations or k-nearest neighbors (KNN) operations that process information and "learn" during query phase 122, image retrieval phase 124, and/or results phase 126. In the exemplary embodiment, retrieval module 120 includes CNN operations that utilize information from hash code comparison and feature data comparison to provide enhanced processing for image retrieval phase 124. For example, in some embodiments, retrieval module 120 determines a metric learning loss 150 of CNN operations based on the feature vectors of image files 114 and trains retrieval module 120 using metric learning loss 150.

In addition, microservices are configured to facilitate communication for retrieval module 120 and other applications that interact with retrieval module 120. In alternative embodiments, retrieval module 120 includes and/or communicates using any computer services that enable retrieval module 120 to operate as described herein.

Figure 4:
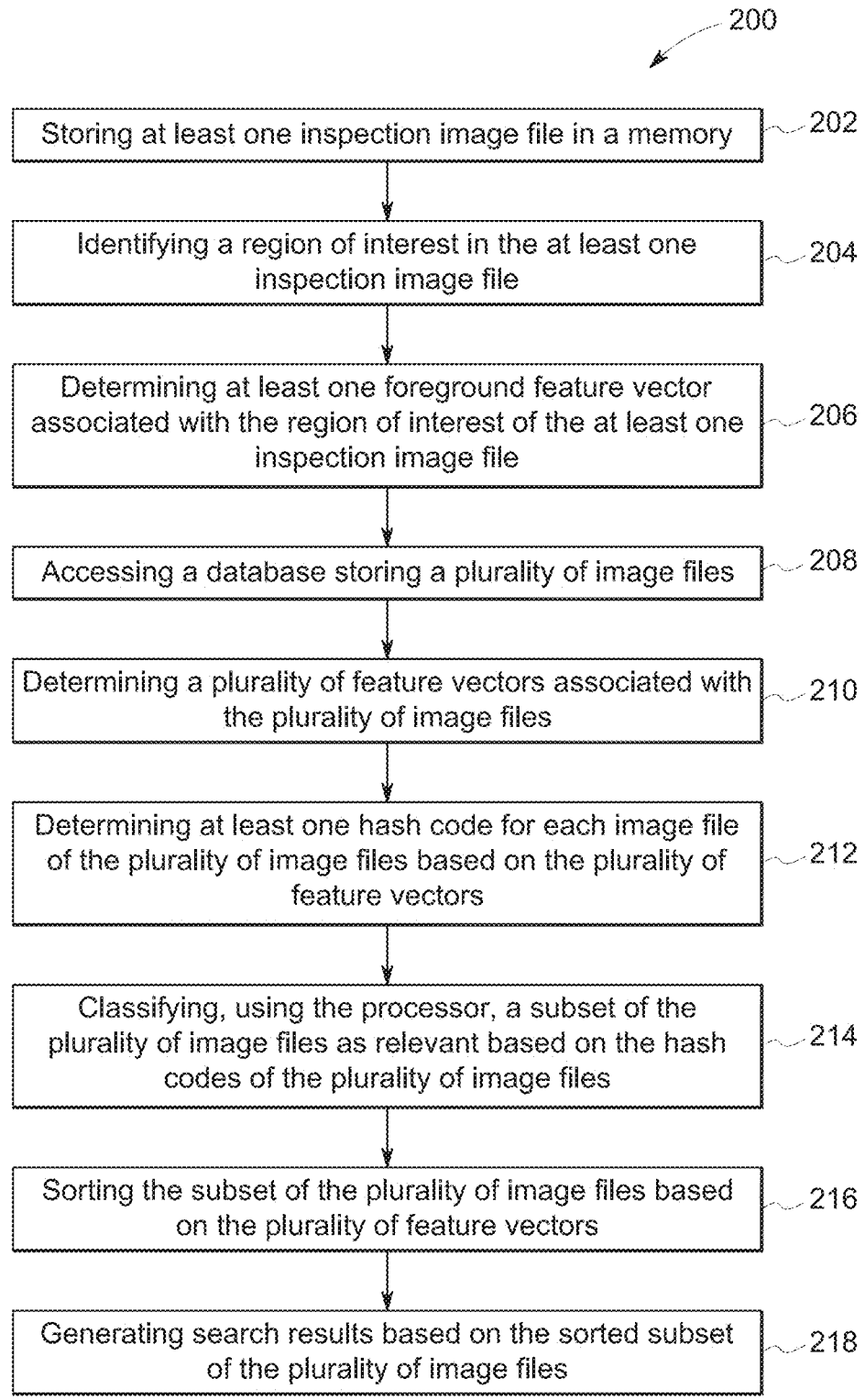
FIG. 4 is a flow diagram of an exemplary method for inspecting a component.

FIG. 4 is a flow diagram of an exemplary method 200 for inspecting a component. With reference to FIGS. 1-4, method 200 includes storing 202 at least one inspection image file 106 in memory 116 and identifying 204 region of interest 130 in inspection image file 106. For example, in some embodiments, a user provides inspection image file 106 with region of interest 130 highlighted via user interface 110 for search request 128. In further embodiments, retrieval module 120 analyzes inspection image file 106 to gather information for search request 128.

Also, in the exemplary embodiment, method 200 includes determining 206 at least one foreground feature vector associated with region of interest 130 of image file 106. In some embodiments, retrieval module 120 determines background feature vectors for the background of image file 106. In addition, in some embodiments, retrieval module 120 determines hash codes for image file 106. Feature vectors and hash codes for image file 106 are stored in vector pairs or sets. For example, inspection image file 106 is associated with at least one set of background vectors (e.g., a background feature vector and a background hash code vector) and at least one set of foreground vectors (e.g., a foreground feature vector and a foreground hash code vector).

In addition, in the exemplary embodiment, method 200 includes accessing 208 database 112 storing a plurality of image files 114 and determining 210 a plurality of feature vectors associated with the plurality of image files 114. Each image file 114 is associated with at least one foreground feature vector and at least one background feature vector. Method 200 further includes determining 212 at least one hash code for each image file 114 of the plurality of image files 114 based on the feature vectors. For example, in some embodiments, the feature vectors are used to generate hash codes for image files 114 using hash net 140. In some embodiments, retrieval module 120 includes at least one convolutional neural network configured to learn from determination 210 of the feature vectors and determination 212 of hash codes and increase the accuracy of retrieval module 120 in determining 210 feature vectors and determining 212 hash codes. For example, in some embodiments, retrieval module 120 determines metric learning loss 150 of convolutional neural network based on feature vectors of image files 114 and trains retrieval module 120 using metric learning loss 150.

Moreover, in the exemplary embodiment, method 200 includes classifying 214 subset 144 of image files 114 as relevant based on the plurality of hash codes. For example, in some embodiments, image files 114 are classified based on hamming distance 142 determined by retrieval module 120. Each image file 114 in subset 144 has a hamming distance less than a threshold value. In some embodiments, a quantization loss is determined at the same time as hamming distances 142.

Also, in the exemplary embodiment, method 200 includes sorting 216 subset 144 of image files 114 based on the plurality of feature vectors associated with image files 114. For example, in some embodiments, similarities between inspection image file 106 and image files 114 are determined based on a comparison of feature vectors 136 of each image file 114 and feature vectors of image file 106. Image files 114 in second subset 144 are sorted in accordance with the similarities between image file 106 and image files 114. In addition, in some embodiments, method 200 includes identifying region of interest 148 in each image file 114 of subset 144 based on a comparison of at least one foreground feature vector of inspection image file 106 and the foreground feature vectors of image files 114. Moreover, subset 144 of image files 114 are sorted using the values of feature vectors 136 such that image files are arranged according to the similarities between inspection image file 106 and image files 114. Accordingly, image files 114 are classified and sorted based on a smaller set of data, e.g., feature vectors and hash codes, than in prior systems without relying on additional metadata or information and the classification process is simpler and quicker than at least some known classification systems.

In addition, in the exemplary embodiment, method 200 includes generating 218 search results 146 based on sorted subset 144 of image files 114. In some embodiments, search results 146 are displayed via user interface 110. Also, in some embodiments, search results 146 include an inspection report highlighting region of interest 148 of each image file 114. In further embodiments, search results 146 includes an inspection report based on the comparison of inspection image file 106 and each image file in subset 144 of image files 114, a list of subset 144 of image files 114, historic inspection reports associated with image files 114, and/or information related to at least one feature or at least one region of interest 130 in inspection image file 106.

At least one technical effect of the systems and methods described herein includes: (a) decreasing retrieval time for image files in databases; (b) providing inspection and classification systems that are able to handle databases with extensive image files and historical data; (c) increasing the recognition accuracy and sensitivity of inspection and classification systems; (d) providing inspection and classification systems that are able to analyze inspection image files at least partly autonomously; and (e) increasing the amount and quality of relevant image files that inspection and classification systems are able to retrieve based on one or more inspection image files.

Exemplary embodiments of systems and methods of identifying features of a component are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing sensor data, and detecting abnormalities.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of inspecting a component using an image inspection controller that includes a processor communicatively coupled to a memory and configured to operate in accordance with an image retrieval module, said method comprising:
   storing, using the processor, at least one inspection image file in the memory;
   identifying, using the processor, a region of interest in the at least one inspection image file;

determining, using the processor, at least one foreground feature vector associated with the region of interest in the at least one inspection image file;

accessing, using the processor, a database storing a plurality of image files;

determining, using the processor, a plurality of feature vectors associated with the plurality of image files, wherein each image file of the plurality of image files is associated with at least one feature vector of the plurality of feature vectors, and wherein the image retrieval module includes at least one convolutional neural network configured to learn from the determination of the plurality of feature vectors and increase an accuracy of the image retrieval module in classifying the plurality of image files;

determining, using the processor, at least one hash code for each image file of the plurality of image files based on the plurality of feature vectors;

classifying, using the processor, a subset of the plurality of image files as relevant based on hash codes of the plurality of image files;

sorting, using the processor, the subset of the plurality of image files based on the plurality of feature vectors; and generating, using the processor, search results based on the sorted subset of the plurality of image files.

2. A method in accordance with claim 1, wherein determining, using the processor, the plurality of feature vectors associated with the plurality of image files comprises determining, using the processor, a plurality of foreground feature vectors and a plurality of background feature vectors, wherein each image file of the plurality of image files is associated with the at least one foreground feature vector and at least one background feature vector.

3. A method in accordance with claim 2 further comprising:

determining, using the processor, the at least one background feature vector associated with a background of the at least one inspection image file;

comparing, using the processor, the at least one foreground feature vector of the at least one inspection image file and the plurality of foreground feature vectors of the plurality of image files; and comparing, using the processor, the at least one background feature vector of the at least one inspection image file and the plurality of background feature vectors of the plurality of image files.

4. A method in accordance with claim 3 further comprising identifying the region of interest in each image file of the subset of the plurality of image files based on a comparison of the at least one foreground feature vector of the at least one inspection image file and the plurality of foreground feature vectors of the plurality of image files.

5. A method in accordance with claim 1 further comprising determining hamming distances between a hash code of the at least one inspection image file and the hash codes of the plurality of image files.

6. A method in accordance with claim 5 further comprising classifying the plurality of image files according to the hamming distances, wherein each image file in the subset of the plurality of image files is associated with a hamming distance less than a threshold value.

7. A method in accordance with claim 1, further comprising:

comparing the at least one foreground feature vector of the at least one inspection image file and the plurality of feature vectors of the plurality of image files; and determining similarities between the at least one inspection image file and the plurality of image files based on a comparison of the at least one foreground feature vector of the at least one inspection image file and the plurality of feature vectors of the plurality of image files.

8. A method in accordance with claim 7, wherein sorting the subset of the plurality of image files based on the plurality of feature vectors of the plurality of image files comprises sorting the subset of the plurality of image files according to the similarities between the at least one inspection image file and the plurality of image files determined using the plurality of feature vectors.

9. A method in accordance with claim 1 further comprising generating the hash codes for the plurality of image files using a hash net based on the plurality of feature vectors associated with the plurality of image files, wherein the at least one convolutional neural network is configured to learn from the generation of the hash codes to increase the accuracy of retrieval module in classifying the plurality of image files.

10. A method in accordance with claim 1 further comprising identifying at least one region of interest in each image file of the plurality of image files, wherein the search results include an inspection report highlighting the at least one region of interest in each image file of the plurality of image files.

11. A method in accordance with claim 1 further comprising determining, using the processor, a learning loss of the at least one convolutional neural network based on the plurality of feature vectors of the plurality of image files.

12. A system for inspecting a component, said system comprising:

at least one memory comprising a database storing a plurality of image files; and at least one processor configured to access said at least one memory and operate in accordance with an image retrieval module, wherein said at least one processor is programmed to:

store at least one inspection image file in the memory;

identify a region of interest in the at least one inspection image file;

determine at least one foreground feature vector associated with the region of interest in the at least one inspection image file;

determine a plurality of feature vectors associated with the plurality of image files, wherein each image file of the plurality of image files is associated with at least one feature vector of the plurality of feature vectors, and wherein the image retrieval module includes at least one convolutional neural network configured to learn from the determination of the plurality of feature vectors and increase an accuracy of the image retrieval module in classifying the plurality of image files;

determine at least one hash code for each image file of the plurality of image files based on the plurality of feature vectors;

classify a subset of the plurality of image files as relevant based on the hash codes of the plurality of image files;

sort the subset of the plurality of image files based on the plurality of feature vectors for the plurality of image files; and generate search results based on the sorted subset of the plurality of image files.

13. A system in accordance with claim 12, wherein the plurality of feature vectors includes a plurality of foreground feature vectors and a plurality of background feature vectors, and wherein each image file of the plurality of image files is associated with the at least one foreground feature vector and at least one background feature vector.

14. A system in accordance with claim 13 wherein said processor is programmed to:
   determine the at least one background feature vector associated with a background of the at least one inspection image file;
   compare the at least one foreground feature vector of the at least one inspection image file and the plurality of foreground feature vectors of the plurality of image files; and
   compare the at least one background feature vector of the at least one inspection image file and the plurality of background feature vectors of the plurality of image files.

15. A system in accordance with claim 12, wherein said processor is configured to:
   determine hamming distances between a hash code of the at least one inspection image file and the hash codes of the plurality of image files; and
   sort the plurality of image files according to the hamming distances, wherein each image file in the subset of the plurality of image files is associated with a hamming distance less than a threshold value.

16. A system in accordance with claim 12 further comprising a user interface configured to receive a search request for the database storing the plurality of image files, and display the search results.

17. A system in accordance with claim 12, wherein said processor is configured to identify at least one region of interest in each image file of the plurality of image files, and wherein the search results include an inspection report highlighting the at least one region of interest in each image file of the plurality of image files.

18. A non-transitory computer readable medium comprising instructions that, when executed by a processor, cause the processor to implement a technique for identifying at least one feature in at least one image of a component, and in implementing the technique, the processor is configured to:
   store at least one inspection image file in a memory;
   identify a region of interest in the at least one inspection image file;
   determine at least one foreground feature vector associated with the region of interest in the at least one inspection image file;
   access a database storing a plurality of image files;
   determine a plurality of feature vectors associated with the plurality of image files, wherein each image file of the plurality of image files is associated with at least one feature vector of the plurality of feature vectors, and wherein an image retrieval module, when executed by the processor, implements at least one convolutional neural network configured to learn from the determination of the plurality of feature vectors and increase an accuracy of said image retrieval module in classifying the plurality of image files;
   determine at least one hash code for each image file of the plurality of image files based on the plurality of feature vectors;
   classify a subset of the plurality of image files as relevant based on the hash codes of the plurality of image files;
   sort the subset of the plurality of image files based on the plurality of feature vectors for the plurality of image files; and
   generate search results based on the sorted subset of the plurality of image files.

19. A non-transitory computer readable medium in accordance with claim 18, wherein the plurality of feature vectors includes a plurality of foreground feature vectors and a plurality of background feature vectors, and wherein said image retrieval module, when executed by the processor, is configured to compare the at least one foreground feature vector to the plurality of foreground feature vectors.

20. A non-transitory computer readable medium in accordance with claim 19, wherein said image retrieval module, when executed by the processor, is configured to identify at least one region of interest in each image file of the plurality of image files, and wherein the search results include an inspection report highlighting the at least one region of interest in each image file of the plurality of image files.

\* \* \* \* \*